United States Patent [19]

Antell

[11] 4,220,396
[45] Sep. 2, 1980

[54] FIBER OPTIC SWITCH

[75] Inventor: George R. Antell, Saffron Walden, England

[73] Assignee: International Standard Electric Corporation, New York, N.Y.

[21] Appl. No.: 894,798

[22] Filed: Apr. 10, 1978

[30] Foreign Application Priority Data

Apr. 14, 1977 [GB] United Kingdom ............... 15529/77

[51] Int. Cl.² .................................................. G02B 5/14
[52] U.S. Cl. ............................... 350/96.15; 350/96.16; 350/96.20
[58] Field of Search ............... 350/96.15, 96.16, 96.20, 350/96.21, 96.22

[56] References Cited

U.S. PATENT DOCUMENTS

| 4,033,669 | 7/1977 | Hanson | 350/96.20 X |
| 4,065,677 | 12/1977 | Micheron et al. | 350/96.16 X |
| 4,088,387 | 5/1978 | Lewis | 350/96.20 X |

FOREIGN PATENT DOCUMENTS

| 2016498 | 10/1971 | Fed. Rep. of Germany | 350/96.20 |
| 1426475 | 2/1976 | United Kingdom | 350/96.15 |

OTHER PUBLICATIONS

Hale et al., "Mechanical Optical-Fibre Switch," *Electronics Letters*, vol. 12, No. 15, Jul. 1976, p. 388.

*Primary Examiner*—John K. Corbin
*Assistant Examiner*—John D. Lee
*Attorney, Agent, or Firm*—John T. O'Halloran; Peter C. Van Der Sluys

[57] ABSTRACT

A fibre optic switch is constructed by having two flat springs each of which carries optical fibres which end at one edge of the spring. The two spring ends are close to each other and at 90°, so that by suitable positioning of the springs any fibre on one spring can be coupled to any fibre on the other spring.

9 Claims, 11 Drawing Figures

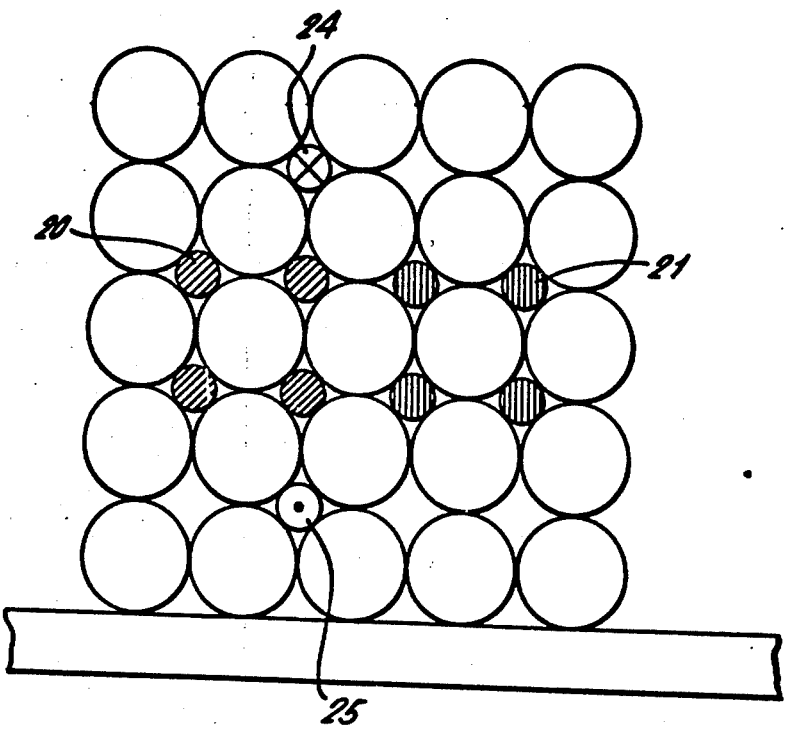
FIG. 4.
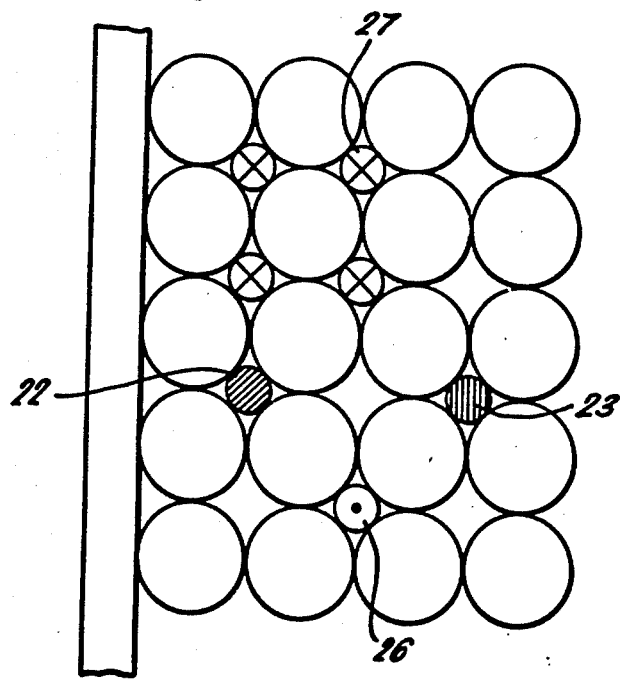

FIBER OPTIC SWITCH

This invention relates to a mechanical arrangement for switching between optical fibres.

Good optical coupling can be achieved between fibres which are axially aligned and which are separated by distances which are small compared to their diameters. Hale and Kompfner have described a mechanical switch in "Mechanical Optical Fibre Switch", in Electronic Letters, 22nd July 1976 Vol. 12 No. 15, at page 388.

The arrangement referred to above embodies some mechanical difficulties, especially where it is desired to switch the light from one optical fibre to any one of a number greater than two of such fibres. An object of the invention is to provide a switching arrangement which minimizes or even overcomes the above disadvantages.

According to the present invention, there is provided a switching arrangement for optical fibres, which includes a flat member which carries one or more optical fibres, the or each said fibre extending along the flat member so as to be terminated at one edge or one end of the flat member, a second flat member which carries a plurality of optical fibres each of which extends along the second flat member so as to be terminated at one end or one edge of the second member, support means for said flat members whereby the ends or edges thereof are closely adjacent to each other but their widths are substantially at 90° to each other, and means for producing relative movement between said flat members, so that the or each said optical fibre on said first flat member can be set into end-on alignment with any one of the optical fibres on the second flat member, light being transmissible between two fibres thus brought into alignment.

Embodiments of the invention will now be described with reference to the accompanying drawings, in which:

FIG. 1 indicates diagrammatically how a switch embodying the invention is arranged.

FIG. 4 shows end-on views of the switch members of a multi-fibre switching arrangement embodying the invention.

Figure 1:
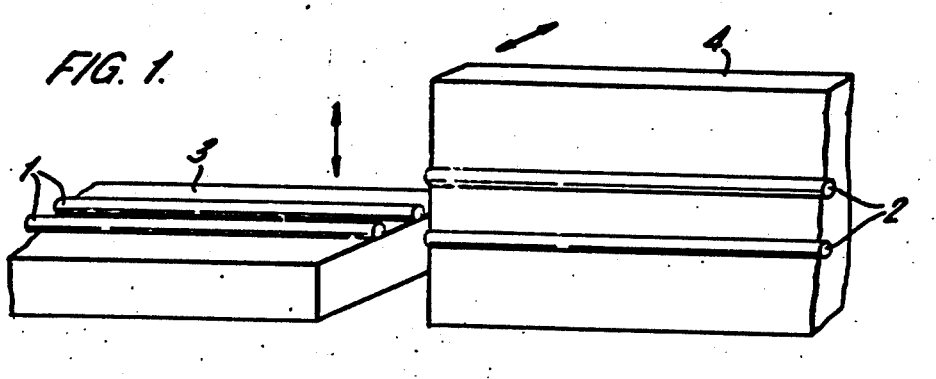

In the simplified drawing which forms FIG. 1 it can be seen that optical fibres 1,2, are attached to the flat faces of two flat springs 3 and 4 arranged orthogonally. The springs are clamped rigidly at one end, the other ends being in close proximity to each other. The direction of travel of the ends of the flat springs which carry the opposing fibres are as shown by the double headed arrows, which enables either of the fibres 1 to be aligned with either of the fibres 2. When so aligned light can pass from one fibre to the other with low loss whereas when not so aligned there is little or no such light transmission.

Figure 2:
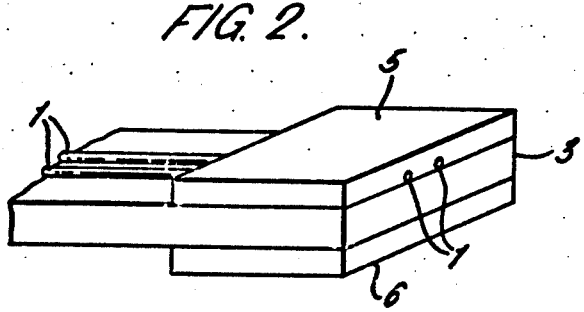
FIG. 2 illustrates diagrammatically one of the switch members of the switch of FIG. 1, with ferrite members for use in controlling its movement.
Figure 3:
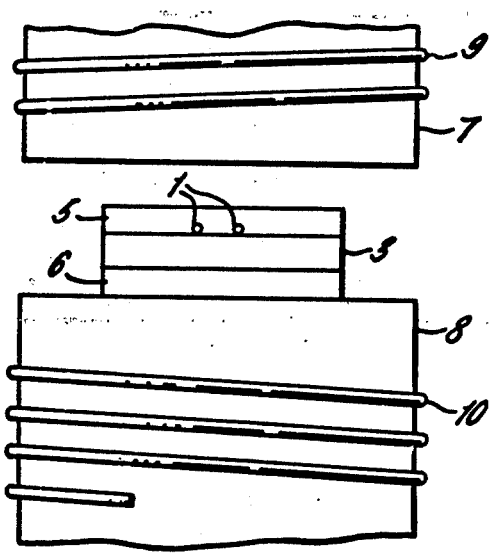
FIG. 3 shows how electro-magnets can be used to control the position of an arrangement such as that of FIG. 2.

Two ferrite or soft magnetic material slabs 5,6 are fixed to the spring 3, see FIG. 2, and the spring is so positioned that the ferrite slabs are between two ferrite slugs 7 and 8 as shown in FIG. 3. The position of the fibres is determined by energizing the appropriate ferrite slug by respective coils 9 and 10. These slugs 7 and 8 serve three purposes, (a) to set the switch in the desired state, (b) to limit the movement of the spring such that the displacement equals the distance between the centres of the fibres and thus allow the fibres to line up at each switching stage, and (c) the strong force between magnets when in contact makes the switch virtually immune to external vibration.

The dimensions of the spring, and thus its stiffness must be matched to some extent to the magnetic force exerted by the ferrite slug, and these factors together with the inertia of the spring determine the speed of the switch. The speed can be maximised by keeping the moving mass as low as possible, but it would be reasonably easy to increase the switching speed by applying a large current to the ferrite coil to initiate switching followed by a much lower latching current. Note that in a simple switch with only one fibre on one spring, only one spring would need to be driven, whereas in arrangements where each spring has two or more fibres both springs are driven.

Various switching patterns can be set up depending upon the number of fibres used. For example one fibre on one spring can be made to address any one of four fibres on the second array when these are arranged in a square array. If a square array of nine fibres on one spring addresses a similar array on the second spring there will be 25 different connections possible through the switch.

The setting up of an array of fibres to the accuracy required for such a co-ordinate-type device exploits the closed-packed structure which can be produced when stacking cylinders whose diameters are in the ratio of $(1+\sqrt{2}):1$, the large diameter fibres being only a few millimeters long. FIG. 4 shows the two arrays which would face each other when mounted on the orthogonally-arranged springs. One array comprises two groups 20,21 of four fibres each, and all four fibres in each group can be addressed by one of the pair of fibres 22,23 in the second array on the other spring. This switch has thus two input fibres and eight output fibres.

Additional fibres 24,25,26 can be incorporated into arrays as shown in FIG. 4, and are used in establishing the final line-up of the switch. The line-up of the switch is achieved by attaching light sources and detectors to the appropriate line-up fibres and aligning the switch to give a maximum output. The arrays can be assembled using the spring as one flat surface and then placing a short block of soft iron or ferrite along the edge of the spring to form the second surface of a 90° V. The fibres are loaded into this V and locked with epoxy. The fibres are then compressed by a second piece of ferrous material from the other side and then downward compaction is achieved by adding a ferrous top plate. This top plate will be attracted by the magnets in the assembled switch.

The various fibres shown in FIG. 4 include four transmission fibres 20, diagonally shaped and four return fibres 21, vertically shaded. These co-operate with a single transmission fibre 22 and a single return fibre 23.

For line-up purposes we have the fibres 25–26 for checking the accuracy of the original positions of the two arrays, and the fibre 24 which co-operates with a set of four fibres 27 arranged in a square array for checking the setting when the switch is operated.

The larger diameter fibres could be made from a variety of materials but glass has advantages: (1) it is easier to polish the end faces of the arrays when the materials have about the same hardness, (2) the large fibres can be pulled readily and thus from one reel or fibre it would be possible to cut lengths so that the diameter ratio of $(1+\sqrt{2}):1$ could be achieved even though there was some variation in the diameter of the small fibres, and (3) opaque or absorbing glass can be readily produced and this would reduce the probability of cross-talk due to scattered light.

The switches could be mounted in groups in sealed containers having optical and electrical connections to the outside. The containers could be filled with an inert matching fluid to reduce the fibre to fibre loss.

Figure 5:
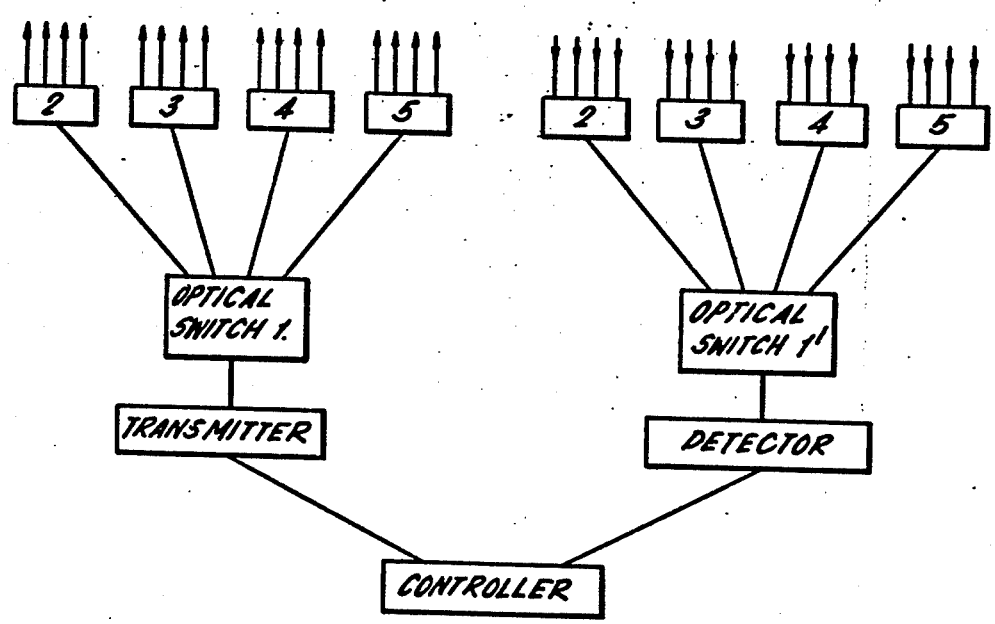
FIG. 5 shows how a switching arrangement embodying the present invention can be used to provide a scanner/distributor arrangement.

A simple system whereby a central control unit can interrogate 16 out-stations is shown in FIG. 5. This requires five switches with the transmission and receive fibres mounted as double 2×2 array on one switch as shown in FIG. 4. The switches and the transmitter would be under the control of an electronic processing unit.

Figure 6:
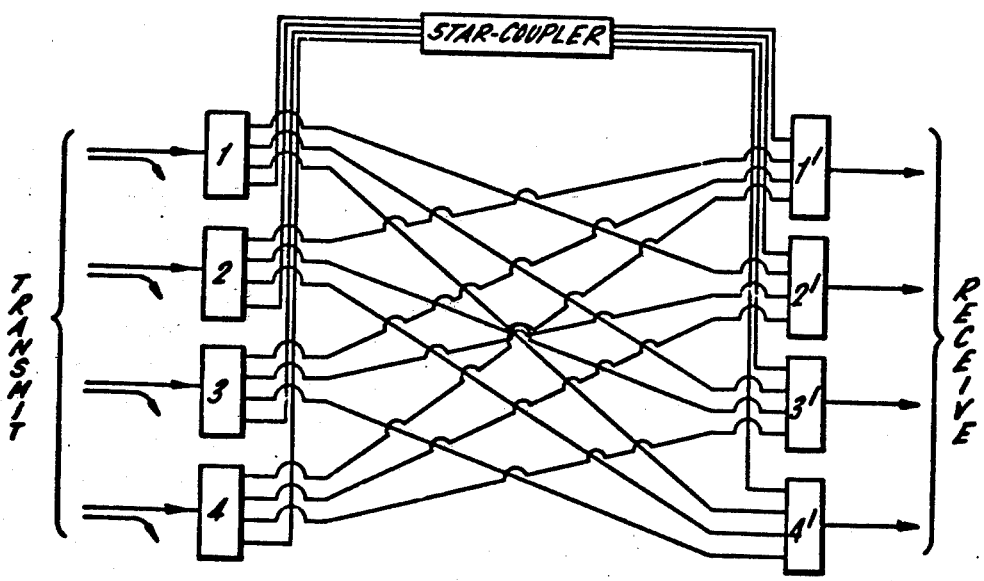
FIGS. 6 and 8 are multiple switching arrangements embodying the present invention.

A more elaborate system is shown in FIG. 6 in which any one of four stations can communicate with any other in the group. In normal operations one of the four fibres in the input array cannot be used since if it was connected to another switch it would pass the 'dialling' code into the system. This apparently useless fibre can be put to good use if a star-coupler is incorporated in the system. The 'unusable' or ground state fibres from each input array are connected to a transmission type star-coupler and the output fibres from the star-coupler are taken to the fourth fibres on the return arrays as shown in FIG. 6. It is thus possible for example for input (1) in the ground state to communicate simultaneously with the other three stations when the other three switches are placed in the fourth position. Thirteen stations can be coupled up likewise using 26 switches in two banks of 13. A star-coupler is connected between the input and return fibres directly without passing through the second bank of switches. Three banks of switches would couple up 49 stations. It should be noted that each input fibre must be supplied with an access coupler to direct a small amount of the input power to the central control unit.

In FIG. 6, the switches 1 and 1', 2 and 2', 3 and 3', and 4 and 4' are ganged together.

With switching arrangements such as those of FIG. 6, if one uses switches having single transmit and receive fibres on one spring blade and two 2×2 arrays on the other, 52 switches would be needed to handle 13 inputs. This number can be reduced to 26, provided that the second bank of switches has six fibres on one spring blade, i.e. 3 transmit and 3 receive fibres, with six 2×2 arrays on the other spring blade. Such an arrangement, which would be a heavier version of the switch described above, is indicated schematically in FIG. 8, which only shows the transmit part of a switch array for coupling 13 stations with 26 switches.

Figure 8:
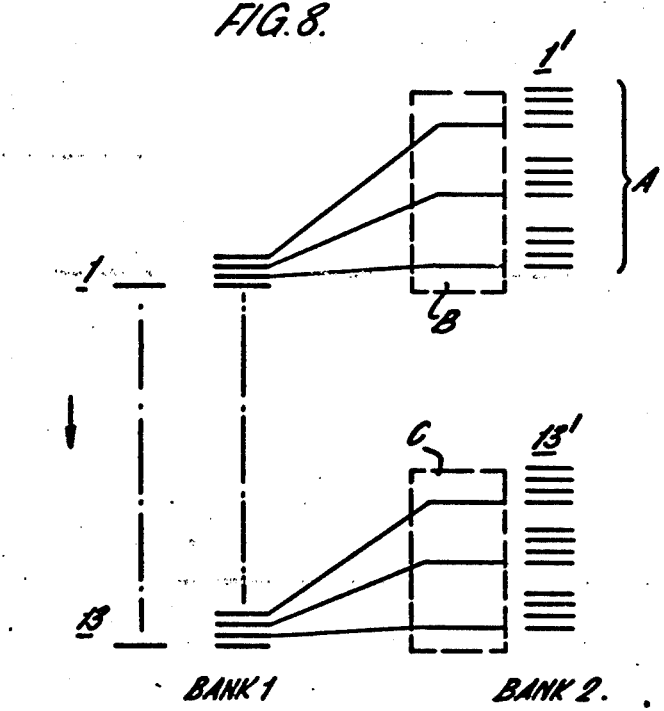

In FIG. 8 switches such as indicated above are used in two banks, and for each portion of bank 2 there are 12 outlets indicated at A which are coupled to the return arrays (not shown). Thus the 12 outlets of the set 1' are respectively connected to the return arrays 2'–13' on the bank 2 and from these back through the return fibres in bank 1. Similarly the 12 outlets of the set 2 (not shown) are respectively connected back to the return arrays 1' and 3'–13', and so on. B and C represent sets of three fibres on one spring blade.

Figure 7:
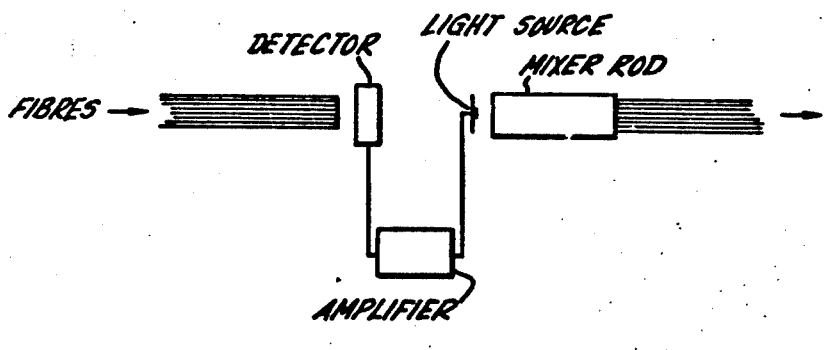
FIG. 7 is a coupling arrangement usable in the arrangement of FIG. 6.

Since the star-coupler is located in a region where electrical power is available it would be an advantage to amplify the signals through the star-coupler so that the signal level received at each station was about the same as that of a direct transmission through the switching system. Such an arrangement is shown in FIG. 7. The incoming fibres to the star-coupler are bunched together and directed on to a detector. The signal is amplified and fed to a laser or light emitting diode which emits light into a large diameter mixer fibre as in a star-coupler and this light is then passed into the output fibres. The coupling of even a light emitting diode to the large diameter mixer fibre should be reasonable.

Figure 9:
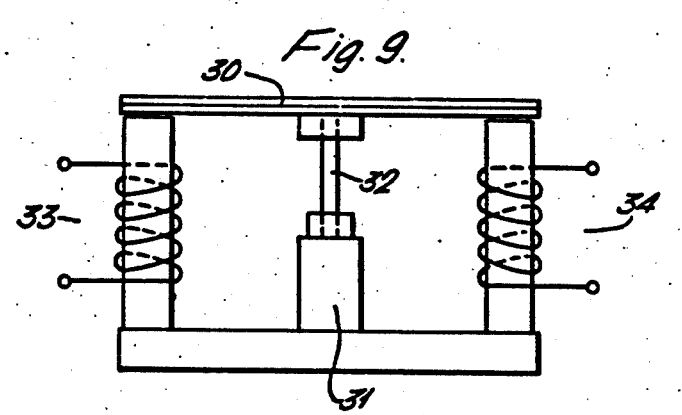
FIGS. 9, 10 and 11 show arrangements embodying the invention.

FIG. 9 shows the use of a magnetically latching relay for controlling one of the flat members used in an arrangement such as that of FIG. 1, in which the flat member 30 is a rigid strip of steel. This strip 30 carries the fibre or fibres (not shown) of one element of the switching arrangement. It is connected to a permanent magnet 31 by a ferro-magnetic spring 32. This spring is of ferro-magnetic material as it has to carry the magnetic flux, and although it is short, e.g. 2–3 mm it is relatively wide, e.g. 10 mms. to avoid magnetic saturation.

The normal condition is as shown with the armature 30 in engagement with the pole piece of the left-hand coil 33. In this condition, with neither of the coils 33 and 34 energized, the flux due to the magnet 31 passes mainly through the pole-piece of coil 33 and holds the armature in this position. If current now flows in coil 33 in a direction such that the flux produced thereby opposes that of the magnet and current flows in coil 34 in such a direction that the flux augments that of the magnet, the armature switches to its position in which it engages the pole-piece of coil 34. When the current ends the device remains in its new position, in which it stays until it is returned to its original state by suitably directed currents in the coils 33 and 34.

Figure 10:
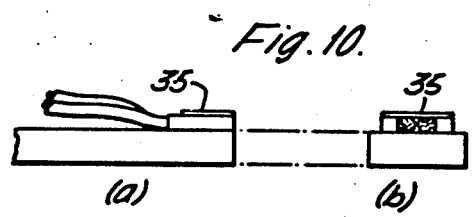
Figure 11:
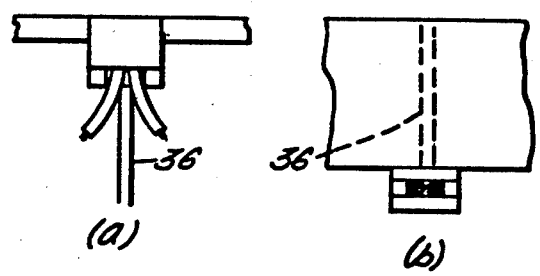

The fibre arrays can be supported on the flat members (whether they are spring strips or not), in at least two different ways. Thus in FIG. 10, of which (a) is a side view and (b) an end-on view, the fibre array 35 is at the end of the strip. In FIG. 11, of which (a) is a side view and (b) a top view the array is at the centre of the flat member. Hence the spring 36 corresponds to the spring 32 of FIG. 9.

I claim:

1. A switching arrangement for optical fibers, which includes a first member which carries one or more optical fibres, having end portions disposed in a first plane and terminated at one edge of the first member, a second member which carries a plurality of optical fibres having end portions disposed in a second plane and terminated at one edge of the second member, support means for said first and second members whereby the edges thereof are closely adjacent to each other, the end portions of the optical fibers are substantially parallel and the first and second planes are substantially at 90° to each other, and means associated with each of said first and second members for producing movement of the one edges of said first and second members in first and second directions respectively, said first and second directions being substantially perpendicular so that an optical fibre on said first member can be set into end-on alignment with any one of selected optical fibers on the second member, light being transmissible between two fibres thus brought into alignment.

2. An arrangement as claimed in claim 1, wherein each said member is a spring strip and each said strip carries portions of ferro-magnetic material which cooperate with electromagnets to produce said relative movement.

3. An arrangement as claimed in claim 2, and wherein at least one of the members is the armature of a magnetically latching relay.

4. A switching arrangement for optical fibers, which includes a flat member which carries one or more optical fibers, the or each said fiber extending along the flat member so as to be terminated at one edge or one end of the flat member, a second flat member which carries two or more rows of optical fibers, the optical fibers being located in the interstices of a pile-up of cylinders, each of which has a larger diameter than do the optical fibers, each of the optical fibers of the second flat member extending along the second flat member so as to be terminated at one end or one edge of the second member, support means for said flat members whereby the ends or edges thereof are closely adjacent to each other but their widths are substantially at 90° to each other, and means for producing relative movement between said flat members so that the or each said optical fiber on said first flat member can be set into end-on alignment with any one of the optical fibers on the second flat member, light being transmissible between two fibers thus brought into alignment.

5. An arrangement as claimed in claim 4, and wherein each said pile up includes additional optical fibres which are used to control the setting of the arrangement to its condition appropriate to a desired switching operation.

6. An arrangement as claimed in claim 4, wherein each said flat member is a spring strip and each said strip carries portions of ferro-magnetic material which cooperate with electromagnets to produce said relative movement.

7. A switching arrangement for optical fibers, which includes a first member which carries one or more optical fibers disposed in a first plane and terminated at one edge of the first member, a second member carrying a plurality of parallel rows of optical fibers, said fibers being located in the interstices of a pile-up of cylinders, each of which has a larger diameter than the optical fibers, said fibers being terminated at one edge of the second member, support means for said first and second members whereby the edges thereof are closely adjacent to each other and the first plane is disposed at substantially 90° to the rows of optical fibers of the second member, and means for producing relative movement between said first and second members so that an optical fiber on said first member can be set to end-on alignment with any one of selected optical fibers on the second member, light being transmissible between two fibers thus brought into alignment.

8. An arrangement as described in claim 7, wherein each of said first and second members carries a plurality of parallel rows of optical fibers located in the interstices of a pile-up of cylinders, each of which has a larger diameter than do the optical fibers and wherein each said pile-up includes additional optical fibers which are used to control the setting of the arrangement to its condition appropriate to a desired switching operation.

9 An arrangement as claimed in claim 7, wherein each said member is a spring clip and each said strip carries portions of ferromagnetic material which cooperate with electromagnets to produce said relative movement.

* * * * *